United States Patent
Stalder et al.

(10) Patent No.: US 8,460,732 B2
(45) Date of Patent: Jun. 11, 2013

(54) METHOD OF PREPARING A NUTRITIONAL COMPOSITION

(75) Inventors: Roland Stalder, Valeyres-sous-Rances (CH); Zenon Ioannis Mandralis, Chexbres (CH)

(73) Assignee: Nestec S.A., Vevey (CH)

( * ) Notice: Subject to any disclaimer, the term of this patent is extended or adjusted under 35 U.S.C. 154(b) by 908 days.

(21) Appl. No.: 11/813,914

(22) PCT Filed: Jan. 24, 2006

(86) PCT No.: PCT/EP2006/050399
§ 371 (c)(1), (2), (4) Date: Jul. 13, 2007

(87) PCT Pub. No.: WO2006/077259
PCT Pub. Date: Jul. 27, 2006

(65) Prior Publication Data
US 2008/0050490 A1 Feb. 28, 2008

(30) Foreign Application Priority Data
Jan. 24, 2005 (EP) .................................. 05100430

(51) Int. Cl.
*B05D 5/12* (2006.01)
(52) U.S. Cl.
USPC ............ 426/476; 426/474; 426/475; 426/115
(58) Field of Classification Search
USPC ................................................ 426/475, 115
See application file for complete search history.

(56) References Cited

U.S. PATENT DOCUMENTS

| 2002/0127005 A1* | 9/2002 | Roberson ...................... 392/442 |
| 2005/0016383 A1* | 1/2005 | Kirschner et al. .............. 99/279 |

FOREIGN PATENT DOCUMENTS

| EP | 1 500 358 A1 * | 7/2003 |
| EP | 1 440 640 | 7/2004 |
| EP | 1440640 A2 * | 7/2004 |
| WO | WO 96/25054 | 8/1996 |
| WO | WO 02/19875 | 3/2002 |
| WO | WO 03/059778 | 7/2003 |
| WO | WO 03/073896 | 9/2003 |
| WO | WO 03073896 A1 * | 9/2003 |
| WO | WO 03/082065 | 10/2003 |

OTHER PUBLICATIONS http://www.shopwiki.com/_Back+To+Basics%2C+Brushed+Chrome%2C+Cocoa+Latte+Hot+Drink+Maker%2C+Brings+The+Cafe+Experience+Into+Your+Home%2C+Heats+To+The+Perfect+Temperature+Every+Time+167+Degrees%2C+Automaticall?s=723123&o=337713316; printed Sep. 8, 2010.*

* cited by examiner

*Primary Examiner* — Patricia George
(74) *Attorney, Agent, or Firm* — K&L Gates LLP

(57) ABSTRACT

A method of preparing a single serving of a nutritional composition comprising introducing water into a disposable capsule (30) containing a unit dose of the composition in concentrated form so as to reconstitute the concentrated composition and operate opening means contained within the capsule to permit draining of the resulting liquid directly from the capsule (30) into a receiving vessel. The method allows individual servings of nutritional compositions such as infant formulas to be prepared with substantially reduced or even eliminated risk of cross contamination from previously prepared servings.

12 Claims, 2 Drawing Sheets

METHOD OF PREPARING A NUTRITIONAL COMPOSITION

Figure 1:
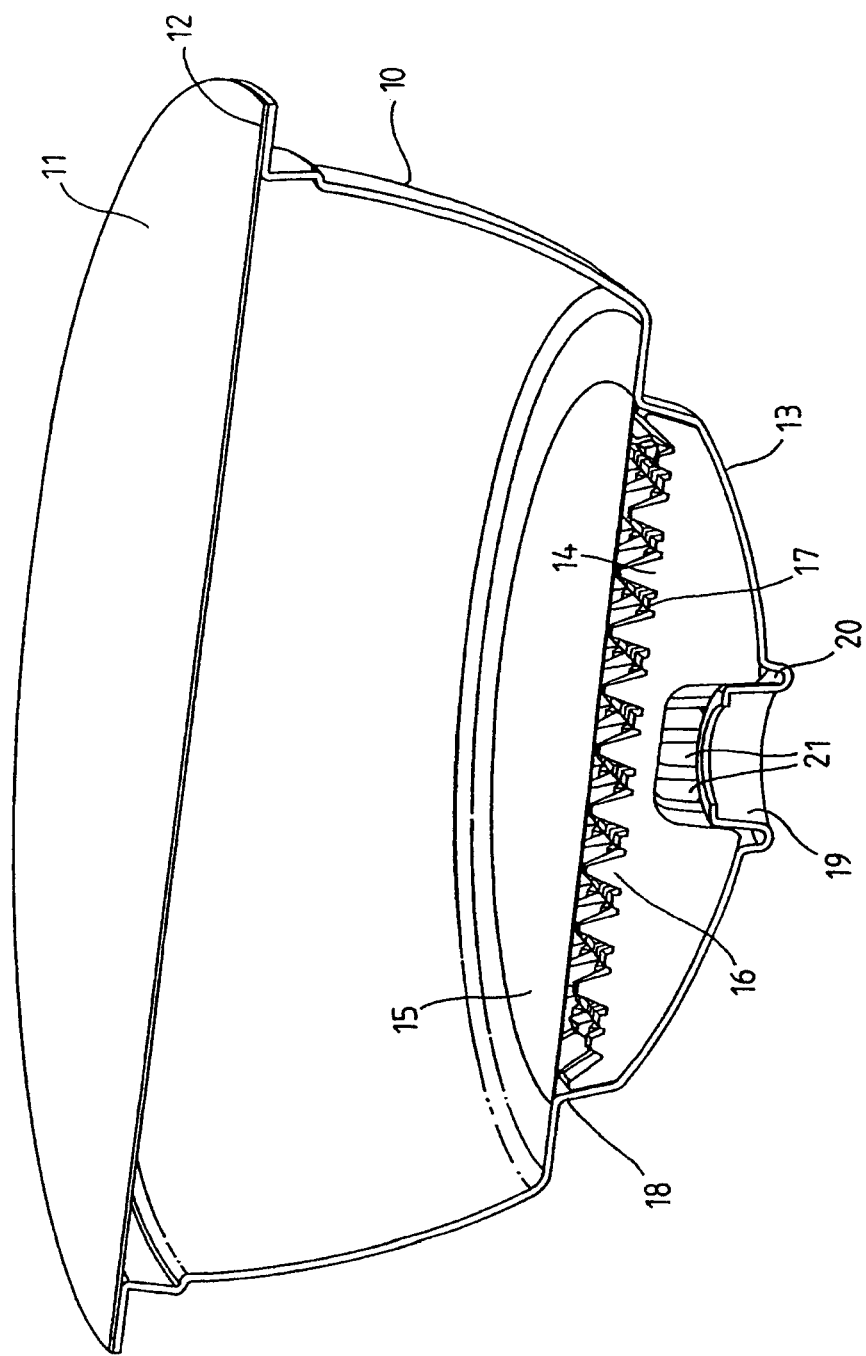

The present invention relates to a method of providing a single serving of a ready to drink nutritional composition such as an infant formula.

THE BACKGROUND ART

Mother's milk is recommended for all infants. However, in some cases breast feeding is inadequate or unsuccessful or inadvisable for medical reasons or the mother chooses not to breast feed. Infant formulas have been developed for these situations.

Generally infant formulas are available in powder form, concentrated liquid form, or ready to feed liquid form. Powdered infant formulas are the most popular form; primarily due to their cost and nutritional quality. The key disadvantage with powdered infant formulas is the inconvenience of preparation. The powdered formula must be spooned into a sterilised drinking vessel, water which has been boiled and allowed to cool is then poured into the drinking vessel to reconstitute the formula, the drinking vessel is then sealed and shaken to ensure the powder has been dissolved. To avoid any bacterial growth, the formula should then be consumed immediately after reconstitution.

If prepared and consumed in this manner, powdered infant formulas provide a safe and nutritionally good substitute for mother's milk in the situations described above. However, primarily due to the inconvenient preparation, many parents or caregivers do not prepare the formulas properly and hence expose the infant to risks of infection or other risks. For example, the water may not be boiled prior to use in which case, any pathogens in the water are fed to the infant. Usually water sources in developed countries are safe but this may not be the case everywhere. Alternatively, batches of the infant formula may be prepared and then stored until needed. Unfortunately, if any pathogen has contaminated the formula, it then has time to replicate.

In hospitals and other care facilities where infants cannot receive one to one attention, the practicalities associated with preparing infant formula for large numbers of infants coupled with concerns about the risk of growth of pathogens in reconstituted formula which is not consumed for several hours have led to drastic measures. For example, some hospitals will not use any powdered products insisting on the use of individual bottles of sterilised ready to drink formula. Other hospitals will prepare all the formula required for a given period which could be as much as 48 hours and then either autoclave the prepared formula to sterilise it or keep it under refrigeration. None of these solutions is ideal from a nutritional point of view. The severe heat treatment necessary to ensure sterilisation can both promote undesirable reactions between the protein and carbohydrate components of the formula and degrade more sensitive components such as vitamins and probiotics. Further, the manufacture and distribution of individual bottles of sterilised liquid formula requires much more packaging as well as leading to higher transportation costs.

An alternative way of approaching the problem is the addition of a specific anti-microbial agent, as is taught in WO 96/25054. However, for infants the consumption of anti-microbial agents on a regular basis should be avoided because of potential damage to the liver and, in addition, because anti-microbial agents often exhibit undesirable side effects.

A nutritionally safe and effective way of inhibiting growth of bacteria in a reconstituted infant formula is acidification. Various powdered infant formulas that have a relatively low pH when made up are marketed, for example under the trademarks Pelargon®, Bionan® and Bioguigoz®. However, the process by which acidification is achieved is time and cost intensive: the basic ingredients of an infant formula are fermented with lactic acid bacteria until a specific pH is achieved, the fermentation is interrupted, the liquid is pasteurised and processed to a powder. The fermentation has to be controlled carefully, because it may in itself provide growth possibilities for pathogenic bacteria and also for bacteriophages which can interfere with the fermentation process. Further, the pH of such formulas cannot be adjusted very accurately or reliably standardised to a specific value. In addition, the taste of the products is not completely satisfactory.

Infant formulas in concentrated liquid form suffer substantially the same disadvantages as powdered infant formulas. Hence they do not provide a better solution. Infant formulas in ready to feed form should in theory provide a solution to the inconvenience of preparation. However, they have their own disadvantages; in particular they are much more costly and bulky. Further, it is often necessary to provide them in a size enabling multiple feeds. However once opened for the first feed, a contamination risk remains.

Similar issues arise with other nutritional compositions for children such as growing up milks and infant cereals, and for nutritional compositions for adults such as feeds used in health care environments.

There is therefore a need for the provision of liquid nutritional compositions in a convenient and safe manner.

Accordingly the present invention provides a method of preparing a single serving of a nutritional composition comprising introducing water into a sealed disposable capsule containing a unit dose of the composition in concentrated form so as to reconstitute the concentrated composition and operate opening means contained within the capsule to permit draining of the resulting liquid directly from the capsule into a receiving vessel.

The invention further extends to a method for the safe and convenient preparation of a liquid nutritional composition comprising inserting a sealed disposable capsule containing a unit dose of the composition in concentrated form into a dispenser which contains a source of water, the capsule having an outlet which opens in response to pressure within the capsule, placing a drinking vessel underneath the capsule outlet and activating the dispenser to open the sealed capsule and to introduce water into the capsule to mix with the concentrate and form the liquid nutritional composition, the water being at a pressure sufficient to open the capsule outlet whereby the nutritional composition flows directly from the capsule outlet into the drinking vessel without contacting the dispenser.

The nutritional composition may be any composition the nature of which makes it susceptible to contamination by pathogens particularly where the intended consumer of the composition may have a compromised or immature immune system. Examples of preferred nutritional compositions for use in the method of the present invention are infant formula, growing up milks and liquid infant cereals. The ingredients of the composition are not critical to the method of the present invention and any powder or liquid concentrate may be used. Examples of different types of infant formula that may be used in the method of the present invention include whey protein dominant formulas, formulas containing a mixture of whey and casein, formulas based on other proteins such as soy, formulas in which the protein component is partially or extensively hydrolysed etc.

The nutritional composition is preferably present in the capsule in powder form but may alternatively be in the form of a concentrated liquid.

The use of a fresh capsule for the preparation of each serving of the composition coupled with the features of providing the capsule with opening means within the capsule and draining the liquid directly from the capsule into a receiving vessel such as an infant's bottle greatly facilitates the safe preparation of single servings of the composition allowing individual servings of ready to drink infant formula for example to be prepared with substantially reduced or even eliminated risk of contamination from previously prepared servings or the environment.

The level of precautions taken to control this risk will depend upon the nature of the composition to be prepared and its intended recipient. For example, if the method is to be used in a hospital nursery where infant formula must be prepared not only for healthy infants but also for infants suffering from specific medical conditions such as severe allergy to cows' milk, it will be important that the infant formula prepared for the allergic infants (which typically will be based either on extensively hydrolysed cows' milk proteins or on free amino acids) is not contaminated with intact cows' milk proteins from infant formula for healthy infants.

In such circumstances, it will be necessary to ensure that the means by which the water is introduced into the capsule does not come into contact with the contents of the capsule. For example, the capsule may be provided with an externally located puncturing element operable to puncture the capsule and allow the introduction of water into the capsule. Likewise, the capsule may be provided with an exit spout by which the liquid may leave the capsule without coming into contact with any possible contaminant on a neighbouring surface.

In other applications, such stringent precautions over and above the essential requirement that the reconstituted liquid is drained directly from the capsule into the receiving vessel may not be necessary. However, in the event that the means by which water is introduced into the capsule comes into contact with the contents of the capsule, it is always preferred to clean such means between uses for example by rinsing with water at an elevated temperature. This may be effected either immediately after a serving has been prepared or immediately before the next serving is prepared.

A dispenser may be provided which is adapted to receive the capsules and supply water to reconstitute the composition. Any dispenser which is capable of receiving the capsules in such a way that the liquid is discharged directly from the capsule without contacting any part of the dispenser may be used. An example of a suitable dispenser is disclosed in, for example, the patent application published under International Publication Number WO 02/19875.

The dispenser may be provided with means to treat the water to remove pathogens for example by pre-heating the water, by filtering the water or by irradiating it with ultraviolet light.

The dispenser may be provided with means to regulate the amount of water dispensed so that it stops the flow of water when a pre-selected quantity has been dispensed.

The dispenser may further be provided with means to flush the capsule with a gas after introduction of the water to empty the capsule of liquid and to restrict any flow back of the nutritional composition into the dispenser. A suitable gas is air at a pressure of between 200 mbar and 2 bar, for example 300 mbar.

The capsule may be configured to suit the chosen dispenser provided always that the configuration is such as to enable opening of the capsule in such a way as to allow liquid to drain directly from the capsule into the receiving vessel and that the means for opening the capsule to allow liquid to drain from it is located within the capsule itself and is operable in response to conditions generated in the capsule by the introduction of water into the capsule. Various suitable capsule configurations of this type are disclosed in our co-pending patent application published under International Publication Number WO 03/059778, the contents of which are incorporated herein by reference. In one example from WO 03/059778, the capsule includes a thin foil which separates the contents from an aperture in the capsule wall. In use, the pressure exerted by the introduction of water into the capsule ruptures the foil and allows liquid to reach the aperture and thence leave the capsule. In other words, the foil functions as a type of single use cracking valve. Alternatively, the opening means may include a silicone cracking valve of the type conventionally used to dispense pasty liquids such as condensed milk.

The capsule may be made in any manner and using any materials suitable to produce the desired configuration and properties. For example, the capsule may be made of a plastics material and thermoformed or injection moulded. It may have a single or multi-layer construction. If the material of which the capsule is made is not air tight, the contents of the capsules will need to be protected from the environment in other ways for example by provision of an external seal as described above or by packing under vacuum or in an inert atmosphere in a can or an aluminium pouch or bag.

If a dispenser is to be used, the external size and configuration of the capsule will be selected with reference to the configuration of the dispenser. Within these constraints, the amount of space taken up in the capsule by the concentrated composition will be governed by a balance between environmental and economic considerations (capsule should not be too large having regard to the volume occupied by its contents) and safety considerations (possibility of contamination of means for introduction of water by contents of capsule if capsule is completely filled). In any event, a range of capsules may be provided containing different quantities of composition, for example to suit the requirements of different age groups in the case of infant formula.

In the case of preparation of infant formula, the delivery of the water may be arranged such that the temperature of the final product in the receiving vessel is at a suitable temperature for the infant to drink immediately, for example at or about 40° C. This may be achieved by initially introducing 30 to 50% of the water into the capsule at a temperature of between 70 and 80° C. and then introducing the remaining amount of the pre-determined quantity at or about room temperature. Alternatively, the water at room temperature may be introduced first followed by the hot water. In both cases the mixture of hot water with water at room temperature will ensure that the resulting ready to drink infant formula is at a temperature suitable for immediate consumption.

The pressure under which water is introduced into the capsule will depend upon the capsule design. In general, ambient or slightly elevated pressures are preferred.

Preferably the water is introduced into the capsule at a position which is offset from the longitudinal axis of the capsule. This eccentric introduction of water encourages the formation of a vortex within the capsule which in turn encourages efficient dissolution and/or dispersion to reconstitute the nutritional composition.

A ready to drink nutritional composition may also be prepared according to the method of the present invention using more than one capsule to prepare a single serving. This permits the introduction of a degree of flexibility in the compositions that may be prepared. For example, a range of capsules containing different supplements may be manufactured and consumers may be provided with instructions as to how to combine these to prepare a personalised composition suited to the particular needs of the recipient.

The invention will now be further illustrated by reference to the attached drawings in which:—

Figure 2:
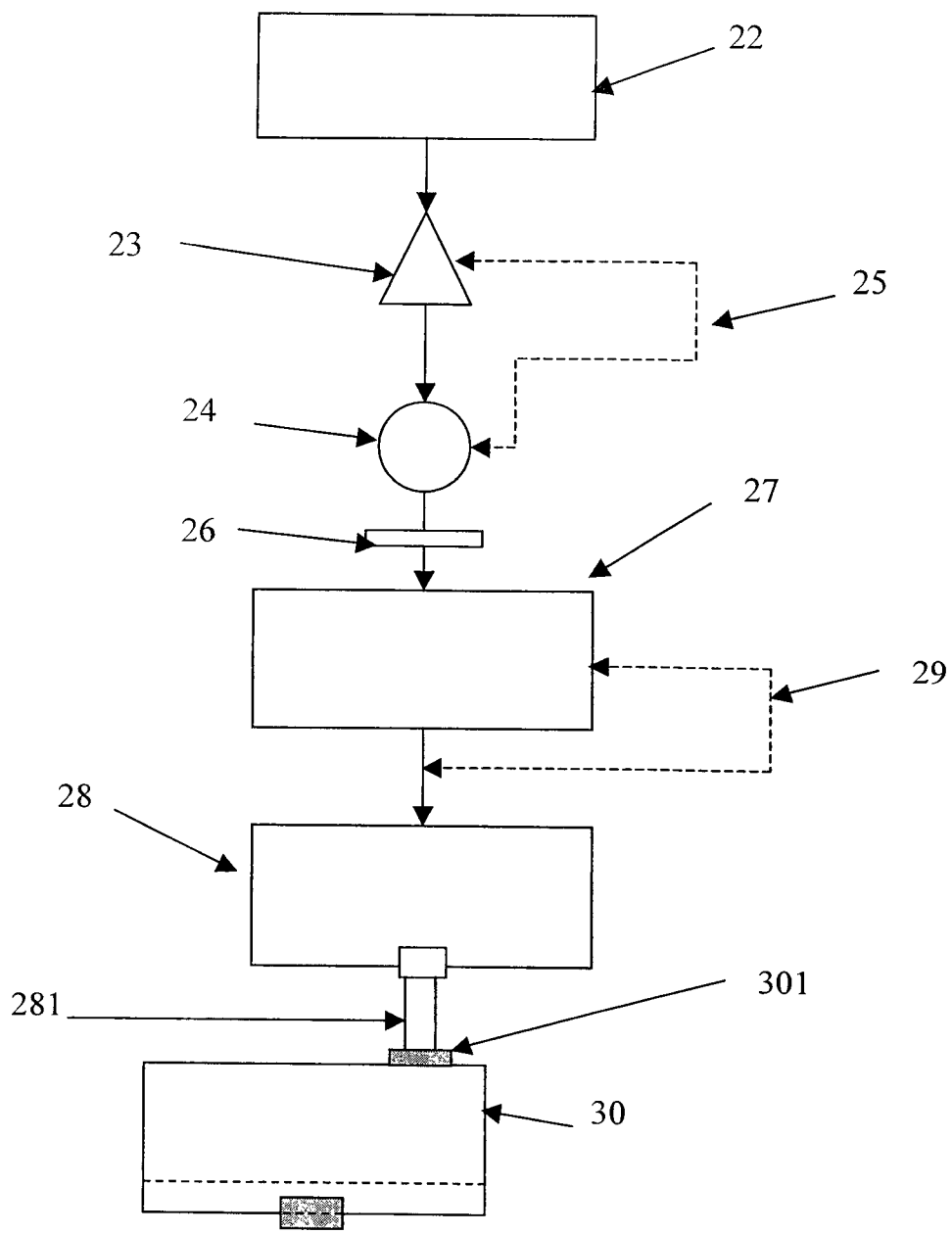

FIG. 1 shows a perspective view of one embodiment of capsule for use in the method of the present invention; and FIG. 2 shows a schematic presentation of equipment suitable for carrying out the method of the present invention FIG. 1 shows a capsule comprising a cup 10 with a membrane 11 sealed to a flange 12 around the periphery of the cup. The capsule includes opening means in a housing 13 forming the lower part of the capsule. The opening means comprises a perforated plate 14 covered by a thin aluminium foil 15. The perforated plate is provided with spikes 16 which project towards the foil 15. The plate further includes a number of channels 17 leading to the periphery 18 of the plate. The housing is provided at its lowest point with a re-entrant tubular portion 19 surrounded at its base by an annular channel 20. Slit shaped apertures 21 are provided in the portion 19. The capsule contains powdered infant formula (not shown) in the region of the capsule bounded by the membrane 11, the walls of the cup 10 and the foil 15. In use, water is introduced into the capsule through the membrane 11. The infant formula dissolves in the water and at the same time the water presses the foil 15 against the spikes 16 thus rupturing the foil. The dissolved infant formula passes via the channels 17 to the periphery 18, thence to the bottom of the capsule where it initially collects in the annular channel 20 and then is dispensed from the capsule through the apertures 21 into a suitable receptacle such as a feeding bottle (not shown). This configuration provides a controlled outflow and reduces the risk of splashing.

FIG. 2 shows, schematically, equipment suitable for carrying out the method of the present invention. The equipment comprises a water supply 22 connected to a flow meter 23 and a pump 24. Flow control means 25 are provided between the flow meter and the pump. The output of the pump is connected via a water filter 26 to a water heater 27. The output of the water heater is connected to a dispenser 28. Temperature control means 29 are provided between the water heater and the dispenser. The dispenser 28 is provided with a conduit 281 adapted to engage with a puncturing element 301 provided on the upper surface of capsule 30. Capsule 30 which is shown only schematically and not to scale in FIG. 2 is in all other respects identical to the capsule of FIG. 1 and contains approximately 10 ml of powdered infant formula. The preparation of a 100 ml single serving of infant formula according to the method of the present invention will now be described In use, the capsule 30 is located in the dispenser 28 such that the conduit 281 engages the puncturing element 301 causing the latter to puncture the membrane sealing the capsule (11 in FIG. 1). Flow control means 25 and temperature control means 29 are set such that dispenser 28 will deliver the desired quantities of water at the desired temperatures. Then dispenser 28 is switched on. 40 ml of water is drawn from the water supply, heated to 70° C. and dispensed through conduit 281 into the capsule. It will be noted that puncturing element 301 is spaced from the vertical axis of capsule 30 and this eccentric location of the point of introduction of water facilitates the development of a vortex within capsule 30 which, in turn, facilitates the efficient dissolution of the infant formula powder. The pressure exerted by the water on foil 15 in the capsule presses it against spikes 16 thus rupturing it. Dissolved infant formula passes first to the bottom of the capsule and then from the capsule to a baby bottle (not shown) placed underneath the capsule. Then the dispenser draws a further 50 ml of water from the water supply and this is dispensed at 17° C. into the capsule where it dissolves any remaining powder, rinses the capsule and then is discharged into the baby bottle. The temperature of the made up infant formula thus produced is 40° C. In this way, a single serving of infant formula may be prepared at a temperature ready for the infant to drink and with substantially reduced risk of cross contamination from previously prepared servings or the environment.

The invention claimed is:

1. A method of preparing a single serving of an infant formula, the method comprising:
   puncturing a portion of a sealed disposable capsule with a puncturing element located in the sealed disposable capsule, the sealed disposable capsule comprising a housing having a perforated plate from which the puncturing element extends, the perforated plate forming a lower part of the sealed disposable capsule, and the sealed disposable capsule containing a unit dose of a concentrated infant formula in a form of a powdered concentrate or a liquid concentrate,
   introducing water into the punctured disposable capsule at approximately ambient pressure in two steps, a first amount of from 30 to 50% of the volume of the serving at a temperature of between 70 and 80° C. and a second amount of the remainder of the volume of the serving at room temperature, so as to reconstitute the concentrated infant formula and form a liquid infant formula, and
   draining the liquid infant formula directly from the punctured disposable capsule into a receiving vessel.

2. The method according to claim 1, wherein the capsule is provided externally with means operable to puncture the capsule and permit the introduction of water into the capsule.

3. The method according to claim 1 comprising controlling the temperature at which the water is introduced into the capsule such that the liquid infant formula in the receiving vessel is at a temperature of between 30 and 40° C.

4. The method according to claim 1, wherein the water is introduced into the capsule at a location offset from a longitudinal axis of the capsule.

5. The method according to claim 1, wherein more than one capsule is used to prepare a single serving of the infant formula.

6. A method of preparing a single serving of an infant formula, the method comprising:
   puncturing a portion of a sealed disposable capsule with a puncturing element located in the sealed disposable capsule, the sealed disposable capsule comprising a housing having a perforated plate from which the puncturing element extends, the sealed disposable capsule containing a unit dose of a concentrated infant formula in a form of a powdered concentrate or a liquid concentrate,
   introducing water into punctured disposable capsule at approximately ambient pressure in two steps, a first amount of from 50 to 70% of the volume of the serving at room temperature and a second amount of the remainder of the volume of the serving at a temperature of between 70 and 80° C., thereby reconstituting the concentrated infant formula and forming a liquid infant formula, and
   causing the punctured disposable capsule to open by the puncturing element rupturing a foil within the punctured disposable capsule after the water is introduced to permit draining of the liquid infant formula directly from the punctured disposable capsule into a receiving vessel.

7. The method according to claim 1, wherein the liquid infant formula is drained directly from the capsule into the drinking vessel without contacting any part of a dispenser containing the capsule.

8. The method according to claim 6, wherein the liquid infant formula is drained directly from the capsule into the drinking vessel without contacting any part of a dispenser containing the capsule.

9. The method according to claim 1 comprising flushing the capsule with a gas after introduction of the water.

10. The method according to claim 9, wherein the gas has a pressure between 200 mbar and 2 bar.

11. The method according to claim 6 comprising flushing the capsule with a gas after introduction of the water.

12. The method according to claim 11, wherein the gas has a pressure between 200 mbar and 2 bar.

\* \* \* \* \*